(12) United States Patent
Aho

(10) Patent No.: US 7,127,489 B2
(45) Date of Patent: Oct. 24, 2006

(54) MESSAGING SERVICE

(75) Inventor: Outi Aho, Lempäälä (FI)

(73) Assignee: Nokia Mobile Phones, Ltd., Espoo (FI)

( * ) Notice: Subject to any disclaimer, the term of this patent is extended or adjusted under 35 U.S.C. 154(b) by 1068 days.

(21) Appl. No.: 09/742,787

(22) Filed: Dec. 20, 2000

(65) Prior Publication Data

US 2001/0034767 A1 Oct. 25, 2001

(30) Foreign Application Priority Data

Dec. 23, 1999 (FI) .................................. 19992782

(51) Int. Cl.
G06F 15/16 (2006.01)
H04Q 7/22 (2006.01)
H04L 12/56 (2006.01)
(52) U.S. Cl. .................. 709/206; 709/228; 455/412.1; 455/433; 370/401
(58) Field of Classification Search ................ 455/213, 455/424, 445, 466, 412.1–2, 433, 435.1; 370/335, 338, 342, 346, 401; 709/206, 218, 709/227, 228
See application file for complete search history.

(56) References Cited

U.S. PATENT DOCUMENTS 6,717,928 B1 * 4/2004 Kalliokulju et al. ........ 370/335
6,728,208 B1 * 4/2004 Puuskari ................... 370/230.1

FOREIGN PATENT DOCUMENTS

| WO | WO 98/19438 | 7/1998 |
| WO | WO 99/61966 | 2/1999 |
| WO | WO 99/66746 | 12/1999 |
| WO | WO 00/56088 | 9/2000 |
| WO | WO 00/64203 | 10/2000 |

OTHER PUBLICATIONS

"Multimedia Messaging Service for GPRS and UMTS", Jarkko Sevanto, IEEE Wireless Communications and Networking Conference, IEEE WCNC 1999, pp. 1422-1426.

* cited by examiner

Primary Examiner—Saleh Najjar
Assistant Examiner—David Lazaro
(74) Attorney, Agent, or Firm—Perman & Green, LLP

(57) ABSTRACT

An object of the invention is a method for implementing a messaging service between a terminal of a cellular network and a messaging server external to the cellular network. The method comprises receiving a message addressed to said terminal at the messaging server and sending an inquiry from the messaging server to a specific first network element of the cellular network to determine the readiness of said terminal to receive data. The method comprises determining by said first network element the readiness of said terminal to receive data and transmitting a specific first response message from the cellular network to said messaging server in response to said first inquiry. The readiness of said terminal to receive data is indicated in the response message for the purpose of transmitting said message to the terminal. In addition, an object of the invention is a system implementing the method, a messaging server and a network element of a cellular network, as well as computer program products implementing the method.

15 Claims, 4 Drawing Sheets

MESSAGING SERVICE

FIELD OF THE INVENTION

The present invention relates to a messaging service. In particular, but not necessarily, the invention relates to the store-and-forward messaging of multimedia messages in a wireless telecommunication system.

BACKGROUND OF THE INVENTION

Wireless communication networks and the Internet network are expanding rapidly and their number of users is increasing. The GPRS (General Packet Radio Service) of the GSM (Global System for Mobile Communications) provides means for transferring information in packet switched mode in a cellular radio network. GPRS also provides an interface to other packet switched networks, such as the Internet network.

FIG. 1 shows the interconnections of a telecommunication network in a packet switched GPRS service. The main element of the network's infrastructure for providing GPRS services is a GPRS support node. GPRS support nodes are categorised into Serving GPRS Support Nodes SGSN which, in packet switched data transmission, correspond to the Mobile Switching Centers MSC of the GSM network, known in connection with circuit switched data transmission, and Gateway GPRS Support Nodes GGSN. An SGSN is a support node that transmits data packets to a wireless terminal MS (Mobile Station) and receives data packets transmitted by a wireless terminal through a Base Station System BSS, comprising base transceiver stations BTS and base station controllers BSC. In this description, the term wireless terminal MS is used to mean all terminals that communicate over a radio interface. Thus, a computer terminal that communicates through a mobile station or, for example, a radio card attached to the computer will also be referred to as a wireless terminal. The SGSN also maintains GPRS registers (not shown in FIG. 1) that contain information on the location of the wireless terminals that move within its service area. Typically, the SGSN is implemented as a separate network element. The GGSN that communicates with the SGSN provides a connection to and enables co-operation with other networks. Such networks are, for example, another operators GPRS (cellular) network or a private network such as, for example, a company's Intranet network, a public switched packet data network PSPDN such as the Internet or an X.25 network.

For a long time, the user of a computer terminal in communication with the Internet network has had the opportunity to retrieve multimedia components, such as pictures, text, short video clips and audio clips in electronic format, into his computer terminal from a server in the Internet. As data transfer rates increase and the properties of mobile stations improve, an interest in a multimedia messaging service and messaging services in general has now also been awakened in wireless networks. Networks that support packet switched data transmission, such as the GPRS network and $3^{rd}$ generation mobile communication networks, such as CDMA2000 (Code Division Multiple Access) and WCDMA (Wideband CDMA) are, in particular very well suited for the implementation of multimedia messaging services.

A multimedia messaging service for $3^{rd}$ generation mobile communication networks has been proposed which will be implemented in a manner similar to the Short Message Service SMS in a GSM network, i.e. substantially in a store-and-forward manner by transferring messages addressed to a wireless terminal, stored in a specific messaging server, to the wireless terminal when it can be contacted. Preferably, the messaging server is located outside the cellular network, for example, in the Internet.

In the following description, a GPRS network will be examined. A wireless terminal "attached" to the GPRS network can transmit and receive data if it has an active PDP-context (PDP=Packet Data Protocol). Activation of the PDP-context may be effected either at the request of the wireless terminal or the network. The PDP-context is activated between the wireless terminal and a GGSN.

The present GPRS specifications support a network-initiated PDP-context activation procedure which can be used to open a data connection before a message is sent to a wireless terminal from a messaging server in a packet data network, such as the Internet. But, according to the GPRS specifications, in order to support the network-intitiated PDP-context activation procedure, the wireless terminal must have a static (permanent) PDP address, for example, a static IP (Internet Protocol) address, which means that the use of dynamic IP addresses in connection with a store-and-forward messaging service would be prevented.

However, from the point of view of cellular network performance, the use of dynamic IP addresses is advisable because in this case a limited number of available IP addresses can be used more effectively than when using static IP addresses. However, dynamic IP addresses can only be used in connection with a messaging service for PDP-contexts where the initiating party was a wireless terminal (wireless terminal initiated PDP-context activation procedure).

The existence of an active PDP-context is only known to the wireless terminal in question, the SGSN serving it and the GGSN with which the PDP-context in question is active. If there is a desire that the messaging service should also operate using dynamic IP addresses, it is necessary to solve the problem of how a messaging server located outside a cellular network can determine whether the wireless terminal to which a message stored in the messaging server is addressed is ready to receive data, i.e. (in the case of a GPRS network) whether the wireless terminal has an active PDP-context with some GGSN.

International patent publication WO 98/19438 presents a solution for implementing a multimedia messaging service in a telecommunication network. The multimedia messaging system presented in WO 98/19438 comprises a multimedia message store, in which a multimedia message addressed to a specific user is stored. The user is provided with an opportunity to communicate the multimedia presentation properties of his terminal device to the multimedia messaging system, which translates said multimedia message either partly or fully, taking into consideration the multimedia presentation properties of the user's terminal stored in a database. After this, the multimedia messaging system sends the multimedia message to the use's terminal. One objective of the invention presented in WO 98/19438 is to provide one common message store, which can be accessed from more than one terminal and network type. WO 98/19438 concentrates almost entirely on the translation of a multimedia message, and it does not identify a problem relating to determining the readiness of a terminal to receive data.

SUMMARY OF THE INVENTION

Now, a new solution for implementing message transmission has been invented. According to a first aspect of the invention, there is provided a method for implementing a messaging service between a terminal of a cellular network and a messaging server external to the cellular network, the method comprising:

receiving a message addressed to said terminal at the messaging server.

The method is characterised in:

transmitting a first inquiry from the messaging server to a first network element of the cellular network to determine the readiness of said terminal to receive data;

determining the readiness of said terminal to receive data as a result of operations performed by the first network element;

transmitting a first response message from the first network element of the cellular network to said messaging server in response to said first inquiry, in which response message the readiness of said terminal to receive data is indicated.

According to a second aspect of the invention, there is provided a messaging server external to a cellular network for implementing a messaging service between the messaging server and a terminal of the cellular network, the messaging server comprising:

means for receiving a message addressed to said terminal at the messaging server, The messaging server is characterised in that it comprises:

means for transmitting a first inquiry to a first network element of the cellular network to determine the readiness of said terminal to receive data.

According to a third aspect of the invention, there is provided a computer program product executable in a messaging server external to a cellular network for implementing a messaging service between the messaging server and a terminal of the cellular network, the computer program product comprising:

program code for causing the messaging server to receive a message addressed to said terminal.

The computer program product is characterised in that it comprises:

program code for causing the messaging server to transmit a first inquiry to a first network element of the cellular network to determine the readiness of said terminal to receive data.

According to a fourth aspect of the invention, there is provided a network element of a cellular network for implementing a messaging service between a messaging server external to the cellular network and a terminal of the cellular network.

The network element is characterised in that it comprises:

means for receiving a specific first inquiry transmitted by the messaging server, the first inquiry comprising a request to determine the readiness of said terminal of the cellular network to receive data;

means for determining the readiness of said terminal to receive data;

means for transmitting a first response message to the messaging server in response to said first inquiry, the first response message comprising information on the readiness of said terminal to receive data.

According to a fifth aspect of the invention, there is provided a computer program product executable in a network element of a cellular network for implementing a messaging service between a messaging server external to the cellular network and a terminal of the cellular network.

The computer program product is characterised in that it comprises:

program code for causing the network element of the cellular network to receive a first inquiry sent by the messaging server, the first inquiry comprising a request to determine the readiness of said terminal of the cellular network to receive data;

program code for causing the network element of the cellular network to determine the readiness of said terminal to receive data;

program code for causing the network element of the cellular network to send a first response message to the messaging server in response to said first inquiry, the first response message comprising information on the readiness of said terminal to receive data.

According to a sixth aspect of the invention, there is provided a system that comprises a messaging server external to a cellular network and a network element of the cellular network for implementing a messaging service between the messaging server and a terminal of the cellular network, the messaging server comprising:

means for receiving a message addressed to said terminal at the messaging server.

The system is characterised in that the messaging server comprises:

means for sending a first inquiry to a first network element of the cellular network to determine the readiness of said terminal to receive data, and that the network element of the cellular network comprises:

means for determining the readiness of said terminal to receive data; and means for sending a first response message to the messaging server in response to said first inquiry, the first response message comprising information on the readiness of said terminal to receive data.

In this description, the terminal can be any wireless terminal that can communicate with a GPRS network or a $3^{rd}$ generation network, for example, a mobile station of a cellular network or a computer terminal in communication with a GPRS network (e.g. via a telephone of a cellular network). In connection with the present application, the concept of a cellular network should be interpreted broadly and is also considered to cover, for example, the GPRS service of a GSM network and the network elements of the core network of a $3^{rd}$ generation network. In a preferred embodiment of the invention, the messaging server is a multimedia messaging server, which is located outside the cellular network in a packet data network, such as the Intranet network of a certain operator, the Internet network or an X.25 network.

In a preferred embodiment of the invention, said first inquiry sent from the messaging server to the cellular network is addressed to a specific network element of a GPRS network, to a GGSN, which determines the readiness of the wireless terminal to receive data and indicates it to the messaging server in said first response message.

BRIEF DESCRIPTION OF THE DRAWINGS

In the following, the invention will be described in detail with reference to the accompanying drawings, in which.

DETAILED DESCRIPTION

Figure 1:
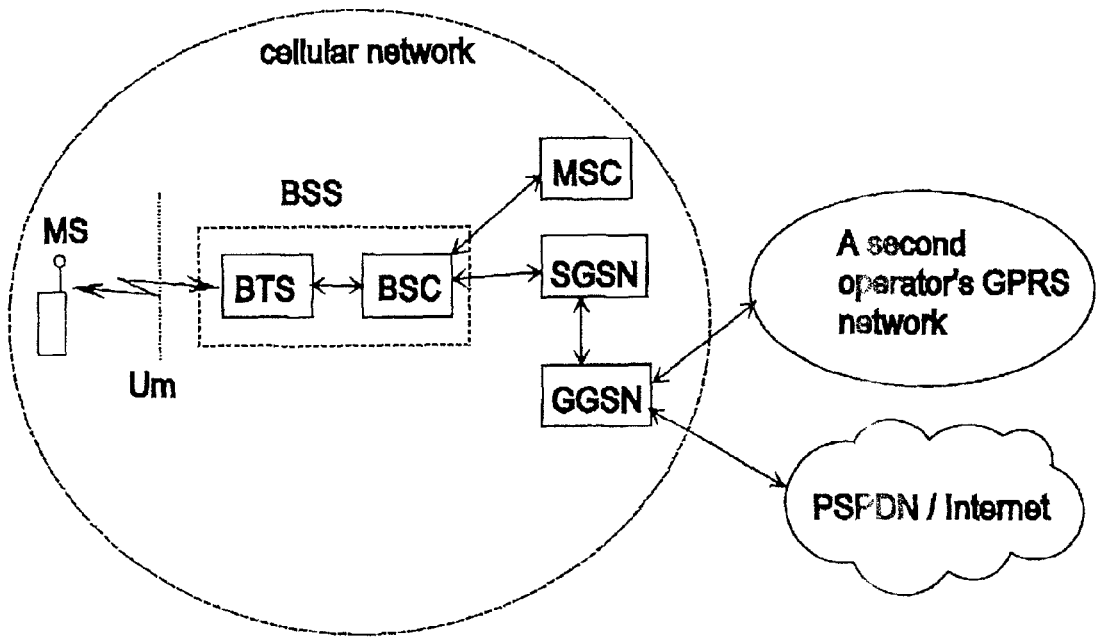
FIG. 1 shows the interconnections of a telecommunication network in a packet switched GPRS service.
Figure 2:
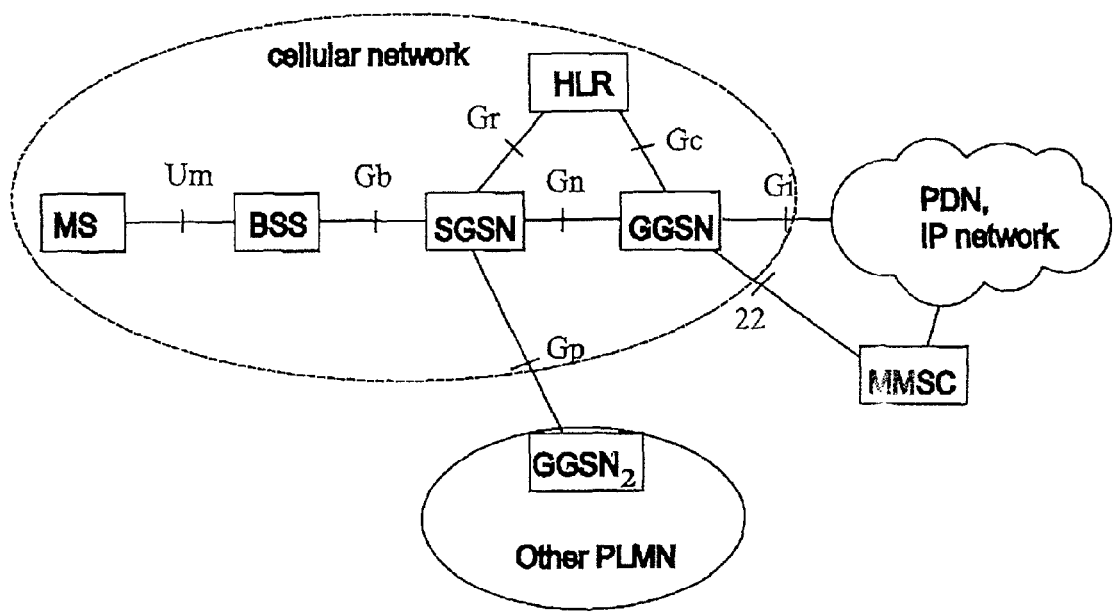
FIG. 2 illustrates an arrangement for implementing message transmission according to a preferred embodiment of the invention.

FIG. 1 was described above in connection with the description of prior art. FIG. 2 illustrates an arrangement according to a preferred embodiment of the invention for implementing message transmission between a wireless terminal MS that supports GPRS and a messaging server. FIG. 2 shows a wireless terminal MS, a Base Station System BSS, a Serving GPRS Support Node SGSN, and a Gateway GPRS Support Node GGSN, a Gateway GPRS Support Node GGSN$_2$ located in the mobile communication network PLMN (Public Land Mobile Network) of a second operator, a Packet Data Network PDN, which in a preferred embodiment of the invention is an IP network, a messaging server that is in communication with the IP network, which in a preferred embodiment of the invention is a Multimedia Messaging Service Centre MMSC, and a Home Location Register HLR that contains the routing information and the GPRS subscription information of the wireless terminal MS. In this description, the term IP network means either an Intranet network managed by a company or an operator, or the open public Internet network.

FIG. 2 also shows the interfaces between different network elements: a Um interface between the wireless terminal MS and the base station system BSS, a Gb interface between the base station system BSS and the SGSN, a Gn interface between the SGSN and the GGSN, a Gi interface between the GGSN and the IP network, a Gr interface between the SGSN and the home location register HLR, a Gc interface between the GGSN and the home location register HLR, as well as a logical interface 22, according to the invention, between the GGSN and the MMSC. In addition, FIG. 2 shows a logical Gp interface between the GPRS cellular networks of different operators.

Technically, the GPRS support nodes of a particular operator are connected to each other within the cellular network by the operator's internal IP network (Intra-PLMN Backbone). However, this should not be confused with the previously mentioned Intranet network, which is external to cellular network and is managed by a company or an operator. However, said IP networks (the Intra-PLMN Backbone network and the Intranet network managed by the operator) are preferably functionally connected to each other, for example, through a gateway. Naturally, the Intranet network may also be managed by the same operator as that responsible for the cellular network.

By agreement between operators, the GPRS networks of different operators are connected by a GPRS network (Inter-PLMN Backbone). In practice, there is typically a firewall and a Border Gateway BG between the Intra-PLMN Backbone network and the Inter-PLMN Backbone network. These are not shown in FIG. 2.

Among other things, the purpose of interface 22 is to enable messaging between the MMSC and the GGSN so that the GGSN can process an inquiry from the MMSC and respond to it. The MMSC is located outside the cellular network, preferably in the Intranet network of an operator. Preferably the interface 22 is implemented using the same protocol as that used in the operator's Intra-PLMN Backbone network, i.e. an IP protocol. Alternatively, the interface 22 can be implemented using some other protocol of the same level.

Figure 3:
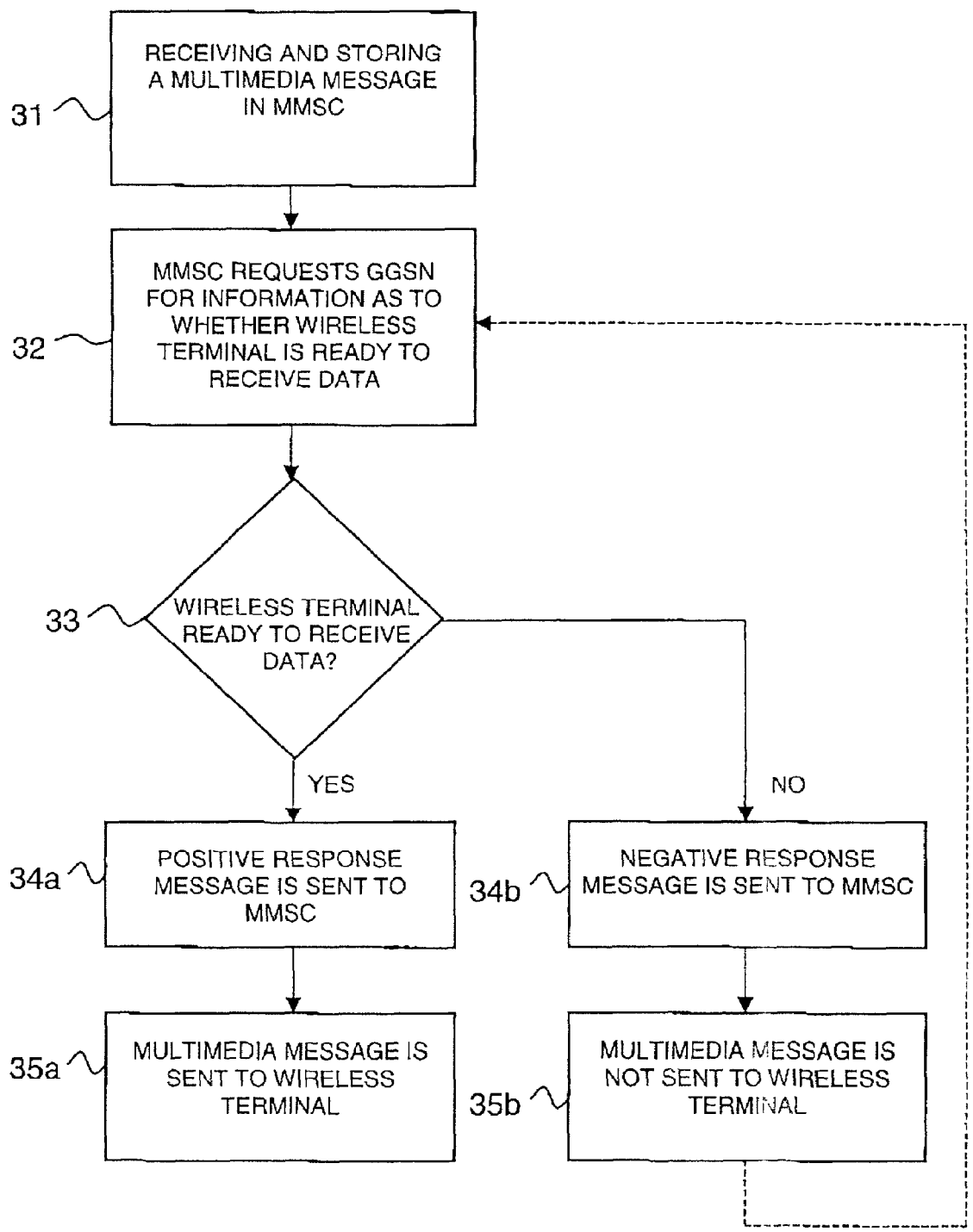
FIG. 3 is a flow diagram that illustrates a method for implementing a messaging service according to the invention.

FIG. 3 is a flow diagram illustrating the general outline of a method for implementing a messaging service according to a preferred embodiment of the invention. The method comprises determining the readiness of the wireless terminal MS to receive data, transferring information about this to an MMSC and, in the case where the wireless terminal MS is ready to receive data, transferring a multimedia message from the MMSC through the GPRS network to the wireless terminal MS.

The steps illustrated in FIG. 3 will now be examined in greater detail. First, a multimedia message addressed to the wireless terminal arrives at the MMSC, and the MMSC stores it in its memory (block 31). Next, the MMSC sends an inquiry to the GGSN through the interface 22, i.e. a message, asking the GGSN for information as to whether the wireless terminal MS, to which the multimedia message is addressed, is ready to receive data (block 32). In block 33, the GGSN determines whether the wireless terminal MS is ready to receive data. In the case of a GPRS network, the GGSN determines whether the wireless terminal has an active PDP-context with some GGSN. If the wireless terminal MS is ready to receive data (a PDP-context is activated with some GGSN), the GGSN sends a positive response message to the MMSC through interface 22 (block 34*a*), after which transfer of the multimedia message from the MMSC to the wireless terminal MS can commence (block 35*a*). If the wireless terminal MS is not ready to receive data (a PDP-context is not activated), the GGSN sends a negative response message to the MMSC through interface 22 (block 34*b*), whereupon transfer of the multimedia message from the MMSC to the wireless terminal MS cannot be started at that time (block 35*b*). This being the case, the inquiry to determine the readiness of the wireless terminal MS to receive data can be repeated, for example, after a specific period of time (dashed line to block 32).

The multimedia message may comprise a plurality of multimedia elements, such as pictures, text, short video clips and audio clips in electronic format. The address of the intended recipient of the multimedia message associated with the multimedia message can be, for example, the telephone number of the wireless terminal MS, the logical network address of a computer terminal attached to the GPRS network, or some other address supported by GPRS, Typically, said address is in RFC822 format. RFC822 is an Internet standard that defines a format in which a logical address can be presented in a form easy for the user to understand. An example of an address in RFC822 format is outi.aho@mmsc1.nokia1.com. Here, "mmsc1.nokia1.com" is the logical address (so-called domain name) of the MMSC in question. The telephone number of a wireless terminal can also be converted into RFC822 format in an IP network. URL (Uniform Resource Locator) pointers can also be attached to said multimedia message.

Typically, the MMSC always sends the inquiry related to the readiness of said wireless terminal MS to receive data to the same GGSN, which will be called a "default-GGSN" from now on. The address of the default-GGSN (typically indicated as a logical domain name, for example in the form ggsn1.nokia1.com) is stored in the MMSC. The MMSC is located in a packet data network. Preferably, the MMSC is located outside the GPRS cellular network in the IP network (Intranet network) of the operator that also manages said default-GGSN. Alternatively, the MMSC can be managed by an external service provider, for example, in the Internet network.

The address of the intended recipient of the multimedia message in plain RFC822 format, stored in the MMSC, is preferably mapped in the MMSC to a specific identifier, external to the cellular network, which is then used as an identifier for the wireless terminal MS in communication between the default-GGSN and the MMSC. The external identifier, is preferably not an identifier used to identify the wireless terminal within the cellular network and in this description, it will be referred to as an MMS-ID (Multimedia Messaging Service IDentity). To perform the mapping, the MMSC comprises a database, in which information relating to the wireless terminal's multimedia messaging service subscription is stored. The correspondence(s) between the MMS-ID and the wireless terminal's address(es) in RFC822 format are also stored in said database. Further details concerning said database are presented in connection with the description of FIG. 5.

The MMS-ID is an identifier external to the of the cellular network, a parameter or a set of parameters, which indicates the MMSC from which the wireless terminal MS in question (the owner of the terminal) has subscribed to a multimedia messaging service. The, MMS-ID has a general data format, so it can be, for example, in a text format and, for example, may appear as follows:

|MMSC ID |User ID |Security ID |, where the vertical lines (|) indicate a separation between the different parts of the MMS-ID. These different parts are, for example, an MMSC ID, which is the identifier of the MMSC in question, a User ID, which is the identifier of the (multimedia messaging) service subscriber, and a Security ID, which can be formed in the MMSC and the default-GGSN on the basis of the MMSC ID and the User ID using a specific algorithm agreed upon in advance. The Security ID can be used in the cellular network to ensure the legitimacy of the MMSC and the subscriber.

The correspondence between the MMS-ID and the IMSI code of the wireless terminal in question is stored in the GPRS network. The database in which it is stored can be implemented in the GPRS network, for example, by means of a DNS (Domain Name System) server. The IMSI (International Mobile Subscriber Identity) code is used as the principal identifier of the mobile subscriber of the wireless terminal MS within the GPRS network. Typically, the IMSI code is stored in a SIM (Subscriber Identity Module) card. The SIM card is used as a subscriber identity unit in the wireless terminal MS. Thus, when the present description refers to the IMSI code of a wireless terminal, this means the IMSI code of a subscriber known to the network, stored in a SIM card or the like, installed In the wireless terminal MS. Correspondingly, when the description refers to a multimedia message addressed to the wireless terminal MS, this means a multimedia message addressed to the subscriber whose SIM card is in the wireless terminal MS.

Depending on the implementation, the database in which the correspondence(s) between the MMS-ID and the IMSI code of the wireless terminal are stored may be located in different places in the teleoperator's GPRS network. The database should be easy for the default-GGSN to access. Said database can also be implemented in an appropriate manner by means other than a DNS server. It is also possible to integrate said database into the HLR, but preferably this is not done, as there is a desire to keep the amount of data to be stored in the HLR as small as possible.

Alternatively, it is possible to use an internal identifier of the cellular network, such as the wireless terminal's telephone number, as the identifier of the wireless terminal in communication between the GGSN and the MMSC (e.g. in an inquiry according to the invention sent by the MMSC to the default-GGSN). In this case, the database, in which correspondences between the telephone number and the IMSI of the wireless terminal are stored, can be implemented in the cellular network by means of a DNS server. However, in a preferred embodiment of the invention, an identifier such as the MMS-ID, which is external to the cellular network and unequivocally identifies the wireless terminal in question is used.

Figure 4:
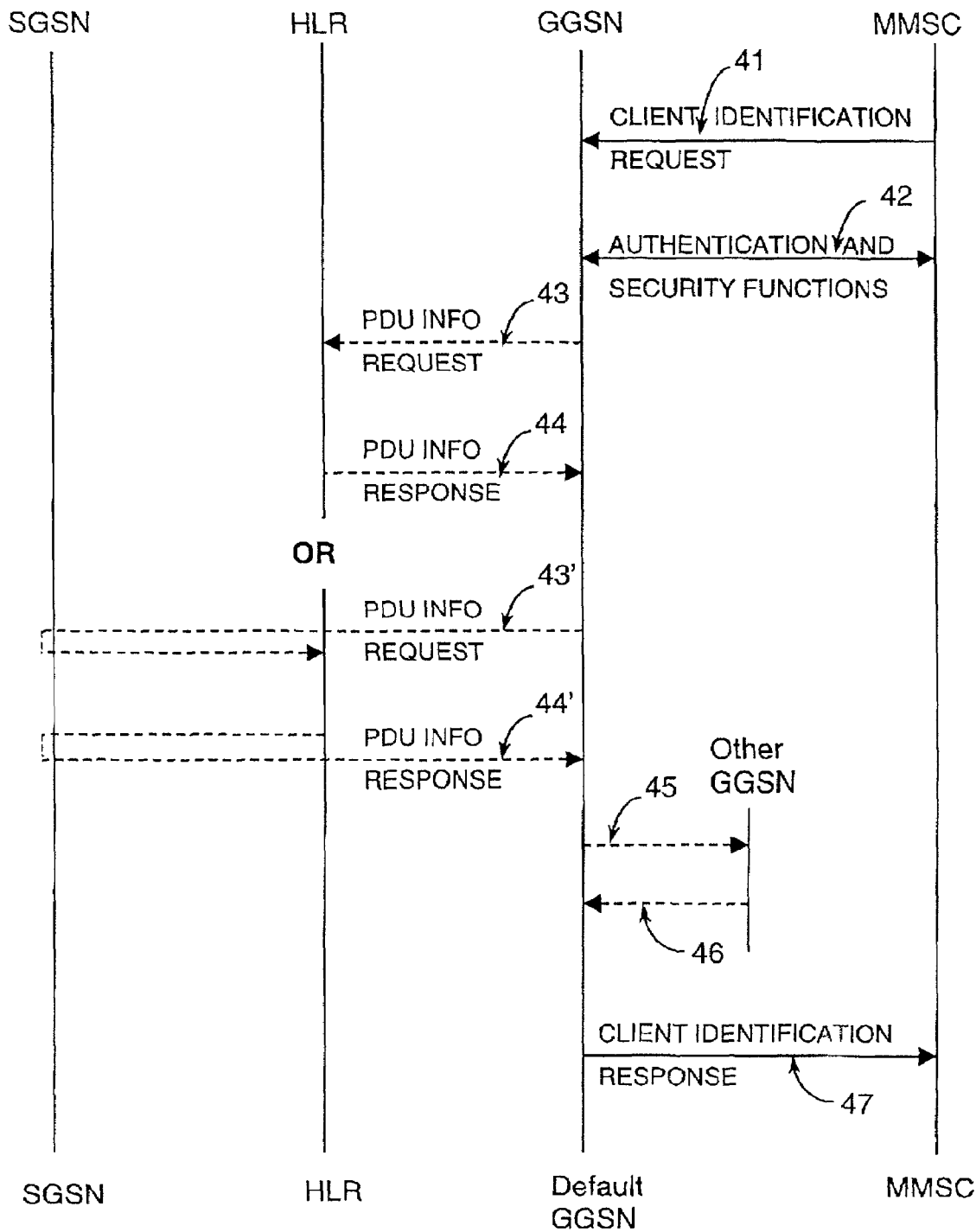
FIG. 4 is a signalling diagram that shows the flow of messages in a method according to the invention.

FIG. 4 shows a message diagram that illustrates the flow of messages between the MMSC and the parts of the GPRS network in a preferred embodiment of the invention. Having mapped the address of the recipient into an MMS-ID, the MMSC sends an inquiry, in the form of a Client Identification Request message 41, to the default-GGSN to determine the readiness of the wireless terminal to receive data. The MMS-ID is delivered with this message. After this, authentication and security functions 42 can be carried out to check that the MMSC in question is authorised to carry out said inquiry. Typically, the Security ID part of the MMS-ID is used during authentication, in such a way that the default-GGSN forms a Security ID on the basis of the MMSC-ID and User ID comprised by the MMS-ID using a specific pre-determined algorithm and compares it to the Security ID (formed by the MMSC) delivered with the MMS-ID. Alternatively, some other security mechanism can be used.

The default-GGSN maps the MMS-ID delivered with the Client Identification Request message 41 to the IMSI code of the wireless terminal to which the MMS-ID in question belongs. The default-GGSN performs said mapping by inquiring about the IMSI code that corresponds to said MMS-ID from the above-mentioned database, in which the correspondences between the MMS-ID and the IMSI code of the wireless terminal are stored (e.g. from the DNS server).

Next, the default-GGSN, which maintains the PDP-context parameters and fields (e.g. IP address) of wireless terminals, examines whether the wireless terminal having the IMSI code in question has an active PDP-context with the default-GGSN. If a PDP-context is active, the default-GGSN knows that the wireless terminal MS is ready to receive data. This being the case, the default-GGSN is also aware of the wireless terminal's IP address, regardless of whether it is statically or dynamically allocated. As a response to the inquiry, the default-GGSN now sends the MMSC a positive Client Identification Response message 47, which indicates that the wireless terminal MS having the MMS-ID in question is ready to receive data. It is possible to indicate the IP address (either dynamic or static) of the wireless terminal in said positive Client Identification Response message 47, or just to indicate that the wireless terminal MS having the MMS-ID in question is ready to receive data through the default-GGSN.

If the MMSC is logically connected with the GPRS (cellular) network, for example, in the operator's own Intranet network, interface 22 can subsequently be used for transmitting the multimedia message to the default-GGSN (and further to the wireless terminal MS). If the MMSC is located in a packet data network (e.g. in the Internet network) managed by an external service provider, typically, the multimedia message is also sent to the MS through the Internet network. According to the invention, the multimedia message is preferably no longer stored in any network element of the cellular network, but the data packets are delivered uninterrupted to the wireless terminal MS. This advantage is achieved by placing the MMSC outside the cellular network. Transmission of data from the packet data network to the GPRS network is well known to a person skilled in the art.

If the wireless terminal MS does not have an active PDP-context with the default-GGSN, the default-GGSN determines whether the wireless terminal MS has an active PDP-context (an existing data connection) with some other GGSN. Preferably, the default-GGSN finds this out by making an inquiry in the form of a PDU Info Request message 43 (PDU=Protocol Data Unit) over the Gc interface to the home location register HLR. Alternatively, if the Gc interface is not implemented in the system, the GGSN can send a PDU Info Request message 43' over the Gn interface to the SGSN and request the SGSN to transfer the message 43' over the Gr interface to the HLR.

Here it should be noted that the PDU Info Request message 43, 43' does not have to be transmitted at all if the wireless terminal MS has an active PDP-context with the default-GGSN, i.e. with the GGSN to which the Client Identification Request message 41 was originally sent from the MMSC. Therefore, the PDU Info Request message 43, 43' and the PDU Info Response message 44, 44' sent in due course as a response, are shown with dashed lines in FIG. 4.

The HLR maintains the GPRS subscriber information of wireless terminals. Among other things, information on the PDP-contexts a wireless terminal having a specific IMSI code is permitted to activate is found in the HLR's "PDP context subscription records" fields. The "PDP context subscription records" fields also comprise an "Access Point Name" field (APN) that indicates, for each IMSI, the Access Points at which a particular wireless terminal MS is permitted to connect to an external packet data network. Here the term external packet data network means the Internet network, for example. On receiving the PDU Info Request message 43, 43', the HLR checks the logical names of the access points permitted to the IMSI in question from the APN field, on the basis of the IMSI code of the wireless terminal MS sent with the PDU Info Request message 43, 43'.

The logical names of the access points are sent by the HLR to the default-GGSN in a PDU Info Response message 44, 44'. The PDU Info Response message is sent from the HLR to the default-GGSN, either directly through the Gc interface (message 44) or via the SGSN over the Gr and Gn interfaces (message 44'). The access point names indicate the GGSNs, with which the wireless terminal MS can have an active PDP-context, to the default-GGSN. A PDP-context can be activated, for example, with another GGSN of the same GPRS network or with a GGSN of a GPRS network (other PLMN) controlled by another teleoperator, such as GGSN$_2$ (FIG. 2).

In the next step, the default-GGSN, to which the original inquiry from the MMSC arrived, determines if any of the GGSNs with which, on the basis of the PDU Info Response message, the wireless terminal MS may have a PDP-context activated, actually has an active context. This investigation is made by sending each of said GGSNs a message 45 (Other GGSN, FIG. 4), which forwards the IMSI code of the wireless terminal in question and requests each GGSN to examine its own PDP-context fields on the basis of said IMSI code to determine whether the wireless terminal in question has an active PDP-context with the GGSN in question. GGSNs controlled by the same operator are interconnected by the operators' internal IP network (Intra-PLMN Backbone network), whereupon the domain name of each GGSN can be used to address the investigation message 45. Investigation messages 45 can be sent to the GGSNs of another operator through the Gp interface between different operators, defined in GPRS, or over the Internet via the Gi interface. However, the Gi interface is preferably not used because, for security reasons, there is a desire not to reveal the secret IMSI code of the wireless terminal to network elements external to the GPRS network. Each GGSN to which said investigation message is sent, responds 46 to the default-GGSN that sent the message, indicating whether the GGSN in question has an active PDP-context with the wireless terminal MS having the IMSI code in question. In the case where a particular GGSN has an active PDP-context with the wireless terminal MS in question, the response message preferably comprises the PDP address (e.g. IP address) of the wireless terminal, particularly if it is a dynamic address. Said information is apparent from the values of the wireless terminal's PDP-context parameters, maintained by the GGSN in question.

On receiving the responses 46, the default-GGSN sends either a positive or negative Client Identification Response message 47 over interface 22 to the MMSC. A positive Client Identification Response message 47 comprises information that the wireless terminal having the MMS-ID in question is ready to receive data via a specific GGSN. Preferably, the message 47 contains the MMS-ID, Said specific GGSN is the GGSN with which the wireless terminal MS has an active PDP-context. If the wireless terminal has active PDP-contexts with more than one GGSN, the addresses of all these GGSNs can be communicated to the MMSC. It is also possible to indicate the PDP address, such as the IP address, of the wireless terminal in said positive Client Identification message 47.

A negative Client Identification Response message 47 comprises information that the wireless terminal having the MMS-ID in question is not ready to receive data, whereupon the MMSC can, for example, send a new inquiry to the default-GGSN to determine the readiness of the wireless terminal MS to receive data, a specific period of time after sending the previous inquiry.

Alternatively, the default-GGSN can check the wireless terminal's readiness to receive data by sending a slightly modified PDU Info Request message 43, 43' to the HLR. In this case, the HLR first looks up the address of the SGSN serving the wireless terminal at that particular moment, from the SGSN Address field maintained in the HLR. The HLR then inquires from the SGSN in question on the basis of the IMSI code of the wireless terminal, over the Gr interface, whether the wireless terminal MS in question has an active PDP-context with some GGSN. The GGSN with which the wireless terminal MS has an active PDP-context is apparent, e.g. from the value of the "GGSN Address in use" parameter maintained by the SGSN in question. On receiving the information it requested from the SGSN, the HLR further sends a PDU Info Response message 44, 44' to the default-GGSN, as described above. It is also possible that the HLR delivers the address of the SGSN serving the wireless terminal MS to the default-GGSN, after which the default-GGSN inquires about the address of the GGSN with which the wireless terminal MS has an active PDP-context from said SGSN, on the basis of the IMSI code.

According to the invention, a GGSN may also refuse to transfer a message from the MMSC to the wireless terminal. For example, if the wireless terminal's telephone bills have not been paid, the default-GGSN may return a negative Client Identification Response message 47 to the MMSC, in which it is indicated that multimedia messaging to the wireless terminal MS in question is not permitted.

Naturally, in this case, the database which maintains the wireless terminal's invoicing data in the GPRS network must be accessible to the default-GGSN. Typically, said negative Client Identification Response message 47 is also sent in a situation, where the above-mentioned authentication and security functions 42 do not succeed. In this case, execution of the method according to the invention will also be halted in the cellular network before the MMS-ID is mapped to the IMSI.

After receiving a positive Client Identification Response message 47, the MMSC sends the multimedia message as data packets to the GGSN with which the wireless terminal has an active PDP-context. Said GGSN forwards the data packets to the wireless terminal MS.

The MMSC can send the data packets to said GGSN via the default-GGSN or through a packet data network, such as an IP network (e.g. Intranet, Internet). If said GGSN is served by an MMSC different from that which communicated with the default-GGSN, the data packets can alternatively be sent to said GGSN through this second MMSC. IP protocols or other protocols supported by the GPRS network can be used for communication between the MMSC and the wireless terminal MS.

The multimedia message, described in connection with the preferred embodiment of the invention, may originate from many different sources. It can comprise, for example, a photograph, fax, home-video clip or voice message sent in electronic format from one wireless terminal to another. It may also contain, for example, an electronic mail message sent from a TCP/IP network to the MMSC, comprising a multimedia component to be transferred to the wireless terminal, or any message comprising multimedia components. Although this description has mainly discussed multimedia messages, the invention is not restricted to a multimedia messaging service, but can be used in any similar messaging service.

In addition to a GPRS network, the invention can also be implemented in $3^{rd}$ generation networks, such as in a WCDMA network, because the uppermost protocol levels of such a network correspond to the uppermost protocol levels of a GPRS network. In a $3^{rd}$ generation network, a 3G-GGSN ($3^{rd}$ Generation GGSN) corresponds to the GGSN, a 3G-SGSN corresponds to the SGSN and a 3G-RAN ($3^{rd}$ Generation Radio Access Network) corresponds to the base station system BSS. According to one proposal, in a $3^{rd}$ generation network, an IMUI (International Mobile User Identity) code corresponds to the IMSI code, and a UIM (User Identification Module) card corresponds to the SIM card.

The invention is also suitable for implementation in a WAP system. In this case, a WAP gateway is situated between the MMSC and the default-GGSN, through which messages travelling between the MMSC and the default-GGSN typically pass transparently.

The invention can be implemented in software by making the required changes to the program code in the GGSN. The functionality of the MMSC can also be implemented programmably. The computer program products in question can be stored in a data medium, for example, in a memory, they can be transferred and they can be executed, for example, in a computer.

Figure 5:
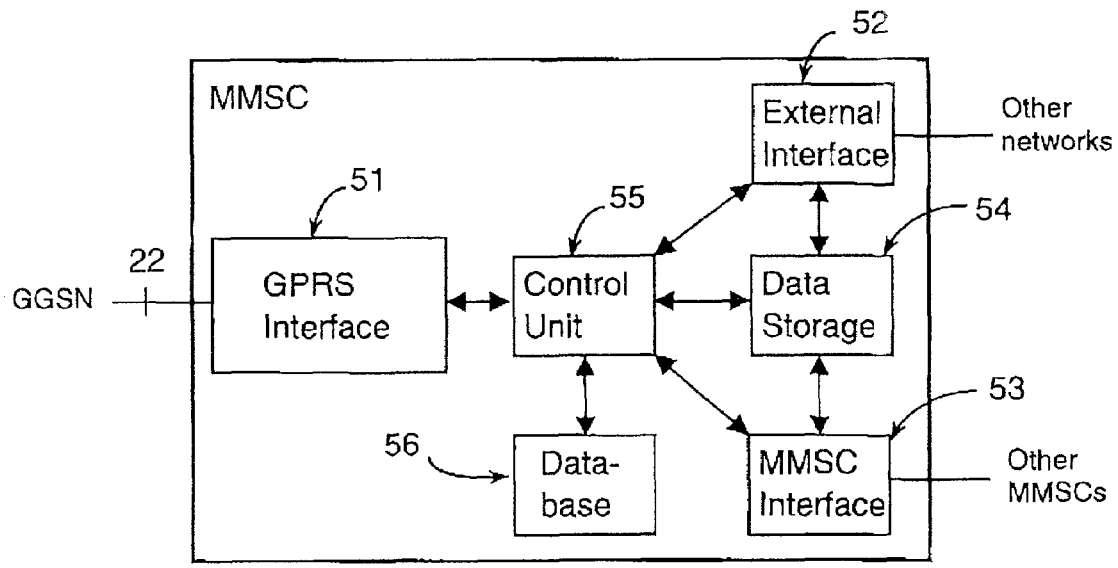
FIG. 5 is a block diagram illustrating functional blocks of an MMSC.

FIG. 5 shows a block diagram illustrating the functional blocks of an MMSC associated with implementation of the present invention. The MMSC comprises a GPRS interface 51 through which the: MMSC communicates with a GGSN of a GPRS network. Communication with other external networks, such as the Internet, is managed through an external interface 52 and communication with other multimedia messaging service; centres is handled through an MMSC interface 53. Data store 54 is a database in which multimedia messages are stored and kept. A control unit 55 controls the operation of the MMSC, For mapping the plain (RFC822 address) of the recipient of a multimedia message to the correct MMS-ID, the MMSC comprises a database 56, in which the correspondences between the plain addresses in RFC822 format and the MMS-IDs are maintained. Additionally, the MMSC comprises some blocks related to authentication and maintenance of the MMSC (these are not shown in the figure).

According to the invention, multimedia messages addressed to a wireless terminal MS arrive at the MMSC via one of its interfaces (51–53) and are stored in the data store 54. On the basis of the data in database 56, the control unit maps the plain address of the wireless terminal MS (e.g. an address in RFC822 format) into an MMS-ID. The database 56 can be maintained, for example, by a telecommunication network operator or a service provider external to the cellular network. A new MMS-ID can be added to said database 56, for example, as follows: When the owner of a specific wireless terminal MS subscribes to a multimedia messaging service, he/she tells the service provider the address(es) of the wireless terminal MS he/she uses (e.g. telephone number, electronic mail-type address). The multimedia messaging service provider then agrees a suitable value for the MMS-ID, by which the wireless terminal will be identified, with the GPRS operator question. Said address (es) of the wireless terminal and the corresponding MMS-ID are stored in the database 56 of the MMSC. Correspondingly, the same MMS-ID is stored in a DNS server in the GPRS network under the control of the GPRS operator and is associated with the IMSI code that corresponds to the address(es) in question.

The inquiry (Client Identification Request) sent to the GGSN is preferably generated at the GPRS interface 51 at the command of the control unit 55, and its transmission takes place via the GPRS interface 51. The response to the inquiry (Client Identification Response) sent by the GGSN is also received through the GPRS interface 51. The GPRS interface 51 and the MMSC interface 66 of the GGSN, presented in connection with the description of FIG. 6, together implement the interface 22. The interface (51–53) of the MMSC through which multimedia messages are subsequently transmitted in to the wireless terminal MS may vary depending on the location of the MMSC and the wireless terminal.

Figure 6:
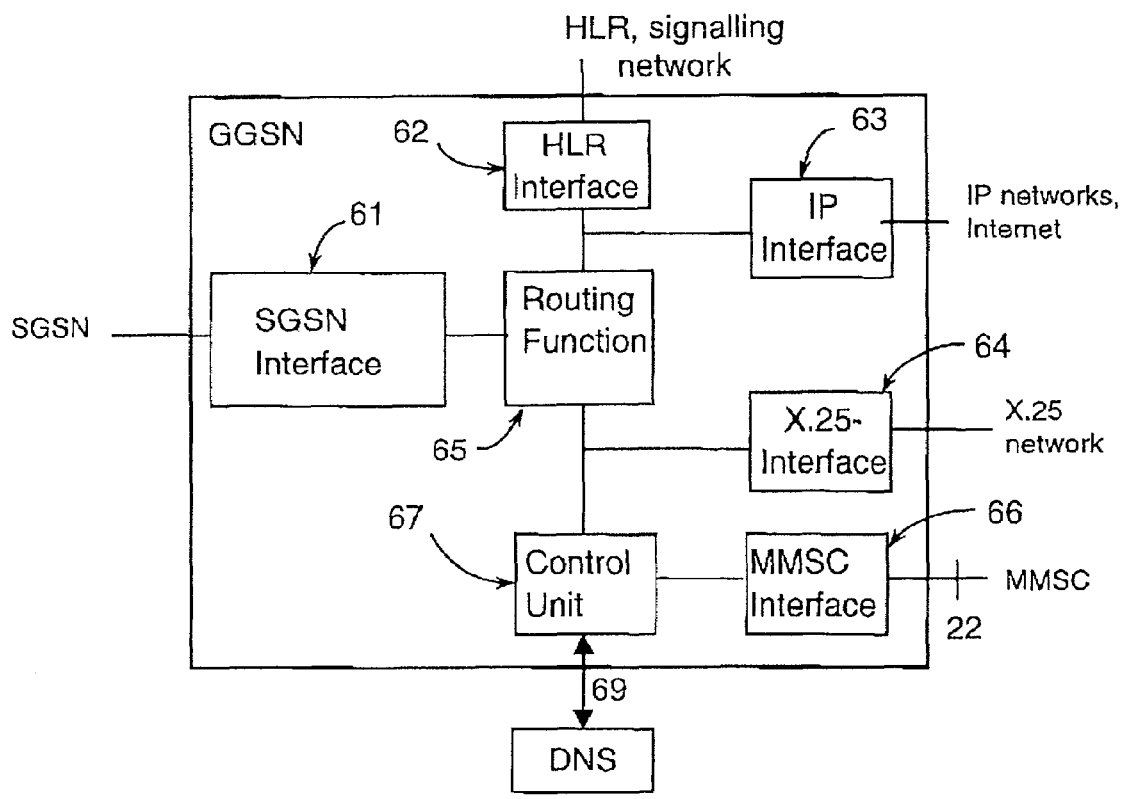
FIG. 6 is a block diagram illustrating functional blocks of a GGSN.

FIG. 6 shows a block diagram illustrating the functional blocks of a GGSN associated with implementation of the present invention. The GGSN comprises an SGSN interface 61 through which the GGSN communicates with the cellular network managed by its own operator (Intra-PLMN Backbone network). The GGSN communicates with an HLR through an HLR interface 62. It is also possible to communicate with other elements of a signalling network (e.g. SS7) through this interface. The GGSN communicates with IP networks (e.g. the Internet) through an IP interface 63 and with an X-25 packet network through an X.25 interface 64. The GGSN transmits messages to the GPRS interface 51 of the MMSC and receives messages from the GPRS interface 51 of the MMSC, in a manner according to the invention, through an MMSC interface 66. The MMSC interface 66 and the GPRS interface 51 of the MMSC together implement the interface 22.

A routing function 65 routes data packets within the network managed by the operator and between the network managed by the operator and other networks. The DNS server is a separate device, typically controlled by the same operator as the GGSN. The GGSN control unit 67, which controls the operation of the GGSN, has a connection 69 to the DNS server. The DNS server contains information on the correspondence between the MMS-IDs and the IMSI codes of wireless terminals. Typically, the control unit 67 maps an MMS-ID arriving from the MMSC in a Client Identification Request message 41 to the correct IMSI code, in a manner according to the invention, by inquiring about the IMSI code the corresponds to said MMS-ID from the DNS server over said connection 69.

Using the present invention, a messaging server located outside a cellular network can determine whether a wireless terminal, to which a message stored in the messaging server is addressed, is ready to receive data. The invention also enables store-and-forward message transmission to a wireless terminal in connection with the use of dynamic PDP addresses, because, according to the invention, the existence of PDP-contexts activated by the wireless terminal can also be determined.

This description presents the implementation and embodiments of the present invention, with the aid of examples. It will be apparent to a person skilled in the art that the present invention is not restricted to details of the embodiments presented above, and that the invention can also be implemented in another form without deviating from the characteristics of the invention. The embodiments presented above should be considered illustrative, but not restrictive. Thus, the possibilities for implementing and using the invention are only restricted by the accompanying claims. Consequently, the various options for implementing the invention as determined by the claims, including equivalent implementations, also belong to the scope of the invention.

The invention claimed is:

1. A first network element of a cellular network for implementing a messaging service between a messaging server external to the cellular network and a terminal of the cellular network, wherein the first network element comprises:

means for receiving a first inquiry sent by the messaging server, the first inquiry comprising a request to determine the readiness of said terminal of the cellular network to receive data;

means for determining readiness of said terminal to receive data;

means for sending a first response message to the messaging server in response to said first inquiry, the first response message comprising information on the readiness of said terminal to receive data, wherein said first network element of the cellular network is capable of knowing values of parameters relating to the readiness of terminals of the cellular network to receive data, the readiness of said terminal to receive data through said first network element being interpreted with the help of said parameter values, the first network element comprising:

for a situation, where said terminal is ready to receive data through the first network element:

means for indicating said readiness in said first response message to said messaging server; and for a situation, where said terminal is not ready to receive data through the first network element:

means for sending a second inquiry to a home location register of the cellular network to determine a set of permissible network elements of the cellular network, the network elements belonging to the set of permissible network elements having in their knowledge values of parameters relating to the readiness of terminals to receive data, and through which network elements said terminal has the ability to receive data; and means for receiving in response to said second inquiry a second response message from the home location register, the second response message indicating said set of permissible network elements to said first network element.

2. A first network element according to claim 1, wherein said first network element is a gateway support node of a GPRS cellular networks.

3. A computer program product executable in a first network element of a cellular network for implementing a messaging service between a messaging server external to the cellular network and a terminal of the cellular network, wherein the computer program product comprises:

program code for causing the first network element of the cellular network to receive a first inquiry sent by the messaging server, the first inquiry comprising a request to determine the readiness of said terminal of the cellular network to receive data;

program code for causing the first network element of the cellular network to determine the readiness of said terminal to receive data;

program code for causing the first network element of the cellular network to send a first response message to the messaging server in response to said first inquiry, the first response message comprising information on the readiness of said terminal to receive data, wherein said first network element of the cellular network is capable of knowing values of parameters relating to the readiness of terminals of the cellular network to receive data, the readiness of said terminal to receive data through said first network element being interpreted with the help of said parameter values, the computer program product comprising:

for a situation, where said terminal is ready to receive data through the first network element:

program code for causing the first network element to indicate said readiness in said first response message to said messaging server; and for a situation, where said terminal is not ready to receive data through the first network element:

program code for causing the first network element to send a second inquiry to a home location register of the cellular network to determine a set of permissible network elements of the cellular network, the network elements belonging to the set of permissible network elements having in their knowledge values of parameters relating to the readiness of terminals to receive data, and through which network elements said terminal has the ability to receive data; and program code for causing the first network element to receive in response to said second inquiry a second response message from the home location register, the second response message indicating said set, of permissible network elements to said first network element.

4. A system comprising a messaging server external to a cellular network and a first network element of the cellular network for implementing a messaging service between the messaging server and a terminal of the cellular network, the messaging server comprising:

means for receiving a message addressed to said terminal at the messaging server, wherein the messaging server comprises:

means for sending a first inquiry to the first network element of the cellular network to determine the readiness of said terminal to receive data, and that the first network element of the cellular network comprises:

means for determining the readiness of said terminal to receive data; and means for sending a first response message to the messaging server in response to said first inquiry, the first response message comprising information on the readiness of said terminal to receive data, wherein said first network element of the cellular network is capable of knowing values of parameters relating to the readiness of terminals of the cellular network to receive data, the readiness of said terminal to receive data through said first network element being interpreted with the help of said parameter values, the first network element comprising:

for a situation, where said terminal is ready to receive data through the first network element:

means for indicating said readiness in said first response message to said messaging server; and for a situation, where said terminal is not ready to receive data through the first network element:

means for sending a second inquiry to a home location register of the cellular network to determine a set of permissible network elements of the cellular network, the network elements belonging to the set of permissible network elements having in their knowledge values of parameters relating to the readiness of terminals to receive data, and through which network elements said terminal has the ability to receive data; and means for receiving in response to said second inquiry a second response message from the home location register, the second response message indicating said set of permissible network elements to said first network element.

5. A method for implementing a messaging service between a terminal of a cellular network and a messaging server external to the cellular network, the method comprising:

receiving a message addressed to said terminal at the messaging server, wherein the method comprises;

sending a first inquiry from the messaging server to a specific first network element in the cellular network to determine the readiness of said terminal to receive data;

determining the readiness of said terminal to receive data as a result of operations performed by the first network element;

sending a first response message from the first network element of the cellular network to said messaging server in response to said first inquiry, in which response message the readiness of said terminal to receive data is indicated;

wherein values of parameters relating to the readiness of terminals of the cellular network to receive data are known to said network element of the cellular network and that the readiness of said terminal to receive data through said first network element is interpreted with the help of said parameter values, the method further comprising:

in a situation, where said terminal is ready to receive data through said first network element, indicating said readiness in said first response message to said messaging server; and in a situation, where said terminal is not ready to receive data through said first network element, sending a second inquiry to a home location register of the cellular network to determine a set of permissible network elements of the cellular network, the network elements belonging to the set of permissible network elements having in their knowledge values of parameters relating to the readiness of terminals to receive data, and through which network elements said terminal has the ability to receive data, and sending in response to said second inquiry a second response message from the home location register to said first network element, the second response message indicating said set of permissible network elements to said first network element.

6. A method according to claim 5, wherein after said second response message has indicated said set of permissible network elements to said first network element, a third inquiry is sent to at least one second network element belonging to the set of permissible network elements by said first network element to determine the readiness of said terminal to receive data through said second network element, the method comprising:

in a situation, where said terminal is ready to receive data through said second network element, transmitting information on said readiness in response to said third inquiry from the second network element to the first network element; and indicating said readiness in said first response message to said messaging sever.

7. A method according to claim 5, wherein in a situation, where said terminal is ready to receive data through a specific network element, the method comprises sending said message addressed to the terminal from the messaging server to the terminal through said specific network element.

8. A method according to claim 5, wherein in a situation, where said terminal is not ready to receive data through any said network element, the method comprises repeating said first inquiry after a specific period of time.

9. A method according to claim 5, wherein said network elements are gateway support nodes of a GPRS (General Packet Radio Service) network.

10. A method according to claim 5, wherein the IP address of said terminal is indicated to said messaging server in said first response message.

11. A method according to claim 5, wherein one of the following is used to identify the terminal MS in the cellular network: an IMSI (International Mobile Subscriber Identity) code, an IMUI (International Mobile User Identity) code.

12. A method according to claim 5, wherein a specific identifier external to the cellular network is used between the cellular network and the messaging server to identify the terminal.

13. A method according to claim 5, wherein said messaging server transfers a multimedia message to said terminal.

14. A method according to claim 5, wherein said first inquiry is always sent from the messaging server to the same first network element.

15. A method according to claim 5, wherein data transmission is effected in a packet switched mode.

* * * * *